No. 774,393.

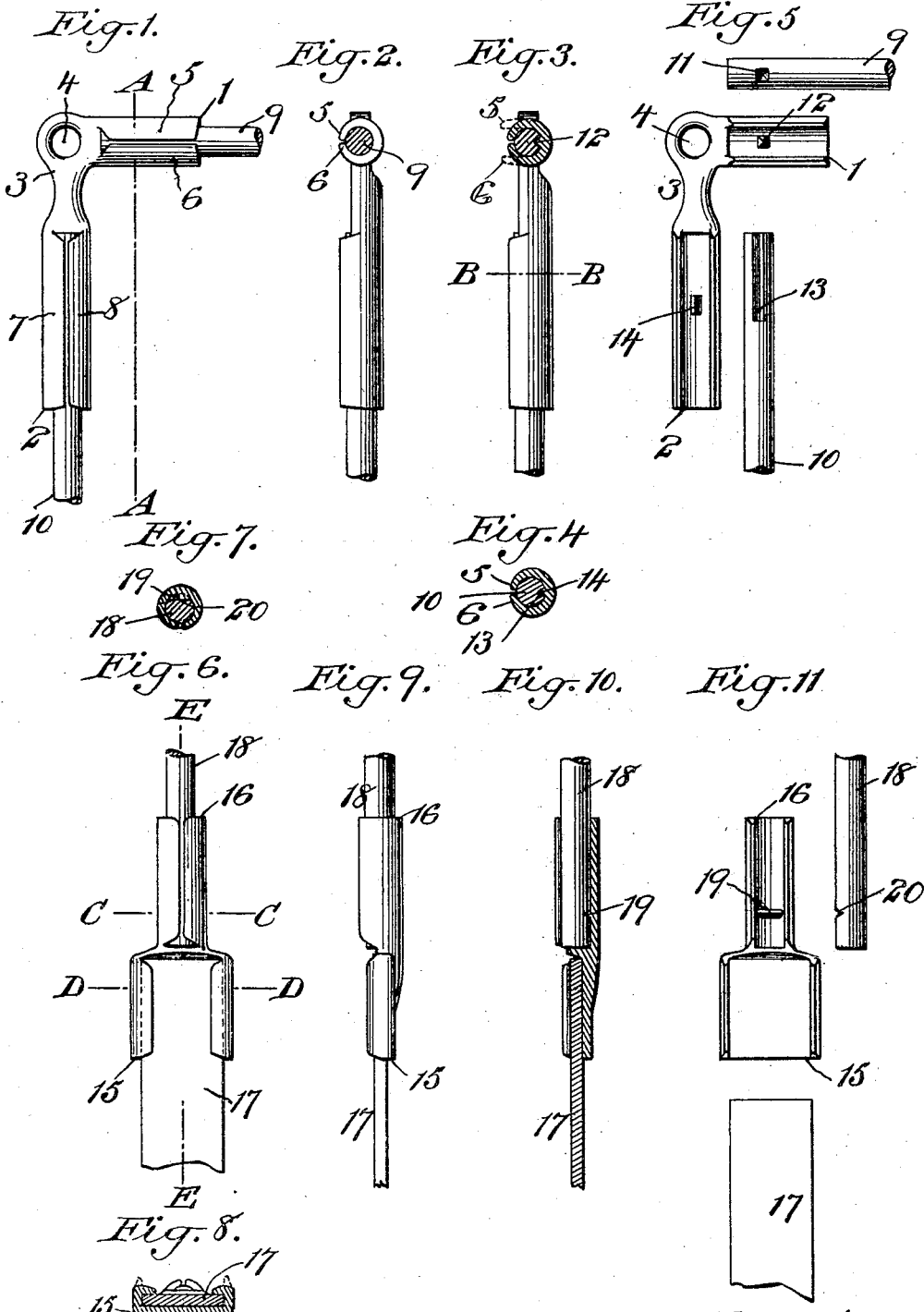

Patented November 8, 1904.

UNITED STATES PATENT OFFICE.

ISAAC E. PALMER, OF MIDDLETOWN, CONNECTICUT.

COUPLING FOR CANOPY-FRAMES.

SPECIFICATION forming part of Letters Patent No. 774,393, dated November 8, 1904.

Application filed November 12, 1903. Serial No. 180,807. (No model.)

*To all whom it may concern:*

Be it known that I, ISAAC E. PALMER, a citizen of the United States, and a resident of Middletown, in the county of Middlesex and State of Connecticut, have invented a new and useful Coupling for Canopy-Frames, of which the following is a specification.

My invention relates to a coupling for canopy-frames, and more particularly canopy-frames for use in supporting canopies from bedsteads, hammocks, and the like where it is desirable that the frame be light and strong and capable of being easily set up and knocked down.

A practical embodiment of my invention is represented in the accompanying drawings, in which—

Figure 1 is a plan view of the coupling in the form in which it appears for use at a corner and in connection with round bars. Fig. 2 is a view of the same turned at an angle of forty-five degrees to the plan shown in Fig. 1. Fig. 3 is a section in the plane of the line A A of Fig. 1. Fig. 4 is a section in the plane of the line B B of Fig. 3. Fig. 5 is a view similar to Fig. 1, showing the parts as they appear before being assembled. Fig. 6 is a view of a modified form adapted for use in connecting two bars, one round and the other angular in cross-section, placed end to end. Fig. 7 is a section through the same in the plane of the line C C of Fig. 6. Fig. 8 is a section through the same in the plane of the line D D of Fig. 6. Fig. 9 is an edge view of the same. Fig. 10 is a section in the plane of the line E E of Fig. 6; and Fig. 11 is a view similar to Fig. 6, showing the parts as they appear before being assembled.

Referring to the form shown in Figs. 1 to 5, inclusive, the coupling consists of two sockets 1 and 2, arranged at right angles and connected by an intermediate piece 3, in which there is preferably formed an opening 4 for conveniently attaching the canopy thereto. Each of the sockets 1 and 2 has its walls split longitudinally and is provided with lips arranged to fold over toward each other to embrace the rod which is to be inserted therein. The folding lips of the socket 1 are denoted by 5 and 6 and the folding lips of the socket 2 by 7 and 8. Before the parts are assembled these lips occupy the position shown in Fig. 5, so that the rods to be connected by the coupling (denoted here by 9 and 10) may have their ends laid into the sockets 1 and 2, respectively, and the lips 5, 6, 7, and 8 then folded over to hold the ends in position.

For the purpose of locking the rods against a rotary movement in the socket I provide one or both of the rods and their respective sockets the one with a projection and the other with an indentation, so that when the lips of the sockets are closed the rods cannot be rotated therein.

In the event it is desirable to lock the rods against longitudinal displacement within the socket at the same time that I lock them against rotary movement therein I provide the rod and the socket the one with a recess and the other with a projection to fit the recess in the direction of the axis of the socket, as well as in the transverse direction of the socket. Such an arrangement is clearly shown in Fig. 5, in which the rod 9 is provided with a tapered indentation or recess 11, in which the tapered projection 12, formed on the inner wall of the socket 1, fits when the rod 9 is placed in the socket. The recess in the rod may be easily formed by forcing a sharp tool into the rod, while the projection 12 in the wall of the socket may be cast thereon.

In the event the rod is to be prevented from a rotary movement in the socket and permitted at the same time to move longitudinally to be withdrawn from the socket, as in knocking down the frame, I provide the recess 13, as shown in connection with the rod 10, Fig. 5, extended to the end of the rod, so that the lug or projection 14 on the inner wall of the socket 2 may travel along the recess 13 as the rod 10 is forced home in the socket and may also travel along the said recess as the rod 10 is withdrawn from the socket. The distance of the lug or projection 14 from the inner end of the socket 2 is a matter of choice, and the said projection may be made long or short, as desired.

In the event a rectangular bar is to be coupled to a round bar either in a direct line, as shown in Figs. 6 to 11, inclusive, or at right angles, as represented in Figs. 1 to 5, inclusive, I form one of the sockets—in the present instance the socket 15—angular in cross-section and the socket 16 circular in cross-section, the former to receive the angular bar 17, which may be of wood or metal, preferably of metal, and the latter to receive the bar 18, of metal or wood, preferably of metal. The wall of the socket 16 may be provided on its inner face with a projection 19—in this instance shown as elongated transversely in the form of a lip—which may be received in a notch 20, formed in the round bar 18, or in the event the latter is made of wood the lip may be forced into the wood as the lips of the socket are closed.

Couplings possessing the characteristics hereinabove described may be readily cast of malleable metal and serve to unite the parts efficiently and expeditiously while they at the same time hold them firmly in place against a rotary movement and against a longitudinal movement whenever required.

What I claim is—

1. A coupling comprising sockets for the reception of the adjacent ends of canopy-supporting bars, a socket and the bar fitted to enter therein being provided the one with a projection and the other with a recess adapted to receive the projection when the parts are assembled, one of said sockets being provided with folding lips to engage the bar.

2. A coupling for the ends of adjacent bars of a canopy-support comprising sockets for the reception of the ends of said bars, the said sockets being split and provided with folding lips, a socket and its bar being provided the one with a projection and the other with a recess adapted to receive the projection to lock the bar against a rocking movement within the socket.

3. A coupling for the reception of adjacent ends of canopy-supporting bars comprising split sockets for the reception of the bars, the sockets and the bars being provided the one with projections and the other with recesses for the reception of the projections, one of said recesses being extended to permit the sliding of the bar in a longitudinal direction while preventing it from a rotary movement in the socket.

4. A corner-coupling for canopy-supports comprising sockets arranged at an angle to each other, the inner walls of the sockets and the walls of the bars to be received therein being provided the one with projections and the other with recesses for the reception of the projections and the said sockets having their walls split and the parts on the opposite side of the wall capable of folding onto the rods or bars located therein when the parts are assembled.

In testimony that I claim the foregoing as my invention I have signed my name, in presence of two witnesses, this 6th day of November, 1903.

ISAAC E. PALMER.

Witnesses:
CHAS. M. SAUER,
PAUL S. CARRIER.